United States Patent Office 3,352,754
Patented Nov. 14, 1967

3,352,754
THERAPEUTIC COMPOSITIONS COMPRISING
ISOFLAVONE COMPOUNDS
Jean Maurice Gazave, Paris, France, assignor to Sarec
S.A., Geneva, Switzerland, a company of Switzerland
No Drawing. Filed Jan. 17, 1961, Ser. No. 83,159
Claims priority, application Belgium, Jan. 19, 1960,
586,723
13 Claims. (Cl. 167—81)

This invention relates to a group of novel therapeutic compositions which comprise certain isoflavone derivatives to be specified. The chief therapeutic uses of the novel compounds include the treatment of vascular disorders, and P-hypovitaminosis conditions. Some of the compounds further possess anti-inflammatory properties.

Applicant's investigations on synthesis products pertaining to isoflavones as a group, have demonstrated that 7-hydroxy-isoflavone and derivatives thereof possess provitaminic properties in regard to vitamine P (or C2) in the sense concerning these properties which have been defined by Szent-Gyorgy and Jean-Louis Parrot. Vitamine P (or C2) is defined by these authors as a compound combining the following properties:

The property of economizing and/or protecting adrenaline;

The property of economizing ascorbic acid (vitamine C);

The property that a combination of vitamines P and C eliminates scurvy in a scorbutic animal where vitamine P alone is inactive and vitamine C alone has weak activity even in high doses. This property has been verified by histological tests involving deficient animals exposed to purely synthetic diets.

The property of increasing tissual and vascular resistance, the rate of increase being moderate in the healthy human or animal subject, and considerable in the deficient subject.

The compounds of the invention have been found to possess the above basic set of properties. They are especially well suited for the treatment of various circulatory disorders, especially blood vessel rupture, heightened blood pressure, meningeal and cerebral haemorrhage, purpura, scorbutic phenomena, Barlow's disease, and other pathological conditions. Broadly speaking the products of the invention are applicable in connection with all manifestations of P-hypovitaminosis, including minor capillary fragility, varicosis, haemorrhoids, local and generalized inflammation, mainly of vascular origin such as phebitis, periphlebitis, etc.

The group of novel therapeutic compounds of the invention can be represented by the general formula:

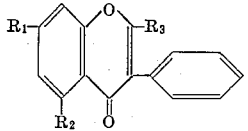

where $R_1$ may be an hydroxyl (—OH) or an alkoxy group; $R_2$ may be a hydrogen or an hydroxyl; $R_3$ may represent a hydrogen or a carboxyl radical (—COOH) which latter may be free, salified or esterified, i.e. unsubstituted or substituted.

Where $R_1$ is an alkoxy group it should preferably contain less than 6 carbon atoms, or better still it may comprise a methoxy (—OCH$_3$) or an ethoxy (—OC$_2$H$_5$) group.

Similarly, where $R_3$ is an esterified carboxyl radical, i.e. a carbalkoxy group, it is preferred that its alkoxy portion should not contain more than 5 atoms, and it is further preferred that it should then be a carbomethoxy (—COOCH$_3$) or a carbethoxy (—COOC$_2$H$_5$) group.

Since it is generally desirable for the products to be water-soluble, one advantageous form of presentation of the novel compounds of the invention is that wherein $R_3$ is a carboxy group salified with an alkaline base, i.e. an alkali metal-substituted carboxy group, such as —COONa.

The novel isoflavone compounds as thus defined may, in accordance with the invention, be prepared by methods which bear some resemblance to conventional methods of isoflavone synthesis.

One advantageous procedure for preparing the compounds of the invention is to react ethoxalyl chloride ClCOCOOC$_2$H$_5$ and a phenyl-benzyl-ketone (I) according to the general reaction

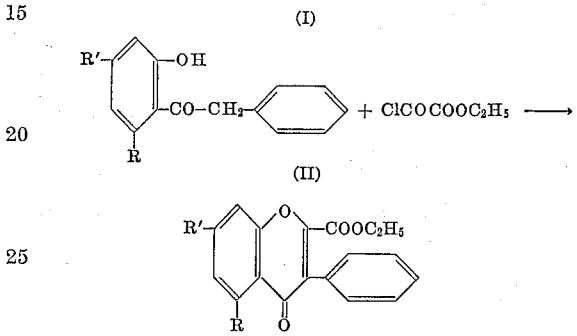

The product (II) is then saponified to yield the free acid:

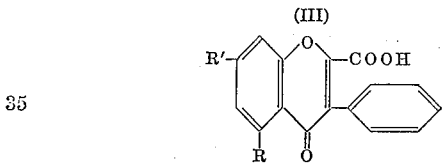

This is then decarboxylated to produce the novel isoflavone derivative.

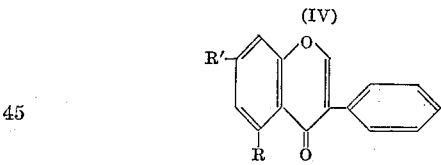

In the product (IV), R' may, inter alia, be an hydroxyl (OH), ethoxy (OC$_2$H$_2$) or a methoxy (OCH$_3$) radical, and R may be an hydroxyl radical or a hydrogen.

For the synthesis of the ethoxyl derivatives, the compounds II and IV above are ethoxylated by reaction with IC$_2$H$_5$ in boiling acetone in the presence of CO$_3$K$_2$.

The following specific procedure is described by way of example.

To a solution of phenyl-benzyl-ketone (I) in pyridine, in a proportion of 10 cc. pyridine per gramme ketone, cooled to a temperature of 4° C., ethoxalyl chloride is added, in a proportion of $n+1$ molar equivalents where $n$ is the number of phenol groups in the ketone used. The temperature is maintained at the value indicated until the addition is completed, whereupon the mixture is allowed to stand for about 15 hours at ordinary temperature. Water is added and chloroform extraction is performed. The resulting organic layer is stripped of its pyridine content by extraction with 10% HCl, then is dried over MgSO$_4$ and evaporated. The resulting product (II) is recrystallized from a water-alcohol mixture. The yield is about 30 to 50%. To saponify the product II, one may either apply heat in the presence of 5% aqueous sodium carbonate for 3 to 4 hours, or treat at ordinary temperature for 24 hours with a 2 N solution of NaOH in acetone (1 molar equivalent NaOH per OH and ester group). The acid (III) is separated after acidification of the reaction medium and recrystallized from an alcohol-water mixture. The yield is about 70–90%.

The decarboxylation step is performed by rapidly heating a small sample (e.g. 50 mg.) of the acid to a temperature exceeding melting point by 10° C. The heating is continued until no more $CO_2$ is evolved, which takes about 2 to 5 minutes. The resulting reaction mass is treated with carbonate to eliminate unreacted acid. It is then recrystallized from an appropriate solvent, e.g. benzene (yield about 75%) to obtain the product identified above as IV.

For ethoxylation of II or IV, the following procedure may conveniently be used:

One mole of II or IV is reacted with 3 moles $IC_2H_5$ in boiling acetone in the presence of 2 moles $K_2CO_3$. The amount of solvent used may vary, e.g. 50 cc. per 1 to 2 grams of the substance being treated. The mixture is agitated at the boil for about 3 hours. The $K_2CO_3$ is filtered off, the mixture is washed with acetone and the solvent is removed by evaporation. The ethoxylated compound is then recrystallized from an alcohol-water mixture (yield about 75%). The ethoxyl derivative of III may be obtained by saponifying the ethoxyl derivative of II.

A few examples of the novel isoflavone compounds which have actually been synthesized by the applicant and tested in vivo and in vitro for the therapeutic properites thereof, will now be given.

(1) *7-ethoxy-2-carboxyl-isoflavone*

The compound has the crude formula $C_{18}H_{14}O_5$ and the following structural formula:

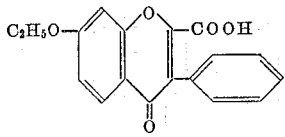

Its molecular weight is 310. Melting point 227° C. It occurs as small white crystals soluble in alcohol, poorly soluble in ether, benzene, chloroform, and very poorly soluble in water. It possesses the provitaminic characteristics defined earlier herein to a very marked degree.

(2) *7,5-dihydroxy-2-carbethoxy-isoflavone*

The crude formula is $C_{18}H_{14}O_6$ and the structural formula:

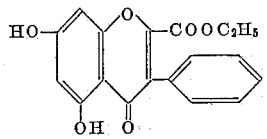

Its molecular weight is 326. Melting point 230° C. It occurs as yellow crystals soluble in alcohol and chloroform, poorly soluble in ether and benzene, very poorly soluble in water. This also is found to be a powerful factor in the economy of ascorbic acid.

(3) *7,5-dihydroxy-2-carboxy-isoflavone*

Crude formula $C_{16}H_{10}O_6$. Structural formula:

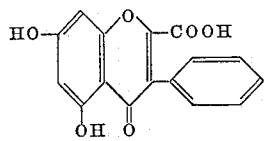

Molecular weight 298. Melting point 254° C. It occurs as yellow crystals, soluble in alcohol and ether, poorly soluble in benzene, chloroform, very poorly soluble in water. The sodium salts thereof on the other hand are soluble in water.

(4) *7-ethoxy-2-carbethoxy-isoflavone*

Crude formula $C_{20}H_{18}O_5$. Structural formula:

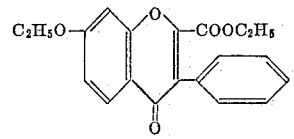

Molecular weight 338. Melting point 123–124° C. The product occurs as pearly-white, shiny crystals, soluble in alcohol and ether, poorly soluble in benzene and chloroform, very poorly soluble in water. In addition to its general provitaminic properties (a high economy factor for vitamine C, increase in tissual and vascuIuar strength), it further has the property of normalizing hydrosaline exchanges at the capillary level, especially when applied percutaneously, as a salve or ointment.

(5) *7-hydroxy-2-carbethoxy-isoflavone*

Crude formula $C_{18}H_{14}O_5$. Structural formula:

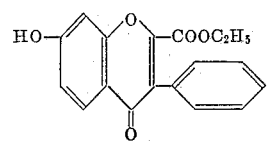

Molecular weight 310. Melting point 212° C. A yellowish white solid; it is soluble in alcohol, benzene and chloroform, poorly soluble in ether, very poorly soluble in water, and has good pro-vitaminic characteristics.

(6) *7-ethoxy-isoflavone*

Crude formula $C_{17}H_{14}O_3$. Structural formula:

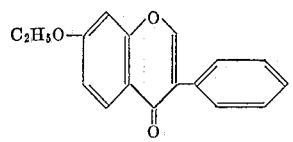

Molecular weight 266. Melting point 152–154° C. A white solid, soluble in alcohol and benzene, poorly soluble in ether and chloroform, very poorly soluble in water. It is a factor in the economy of ascorbic acid and furthermore it increases tissual and vascular resistance as well as normalizing hydrosaline exchanges at the capillary level when applied percutaneously. It also exhibits a high antiinflammatory activity both on a general and a local basis.

(7) *5-7-dihydroxy-isoflavone*

Crude formula $C_{15}H_{10}O_4$. Structural formula:

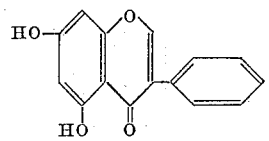

Molecular weight 254. Melting point 191–193° C. A sandy-yellow solid, soluble in benzene, ether, alcohol and chloroform, practically insoluble in water. Administered in any appropriate form (such as bolus, tablets, cachets, ointment), it exhibits the previously indicated physiological properties of ascorbic acid economy and other provitaminic properties.

(8) *7-ethoxy-5-hydroxy-2-carbethoxy-isoflavone*

Crude formula $C_{20}H_{18}O_6$. Structural formula:

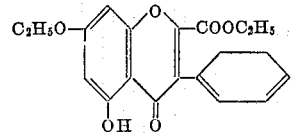

Molecular weight 354. Melting point 90–93° C. Small yellow crystals, soluble in alcohol at elevated temperature, somewhat soluble in water at elevated temperature, soluble at ordinary temperature in ether, benzene and chloroform. It exhibits therapeutic properties similar to those of 7-ethoxy-2-carbethoxy-isoflavone described above under (4).

In human therapeutics the compounds of the invention may be applied in a wide variety of forms, such as:

Cutaneously, as salves, creams or ointments;
Rectally, as suppositories;
Orally, in solid form as cachets, tablets, pills, capsules, and in liquid-suspended form as drops or syrup;
Parenterally, as sub-cutaneous, intra-muscular and even endo-veinous injections of the soluble sodium salts of the compounds.

Posology may range from 5 to 150 mg. per diem depending on the case. This range is not restrictive, and certain among the compounds of the invention may be given in amounts as high as 500 mg.

The ensuing non-restrictive examples will serve to illustrate the biological experiments and a few of the therapeutic applications to which the novel compounds have been exposed.

EXAMPLE 1

The P-provitaminic activity of the sodium salt of 5-7-dihydroxy-2-carboxy-isoflavone has been tested on guinea-pigs. This test animal is known to be susceptible to a form of scurvy fully comparable to the human form of the disease, both as regards the clinical manifestations and attendant histological disorders.

The guinea-pigs used were young adult males of the "three-colour" variety, weighing at least 500 g. The animals were exposed to a synthetic diet comprising all the basic food principles including sufficient doses of ascorbic acid. The basic scorbutic diet was:

32 grams pure casein, 160 g. pure starch, 30 g. cellulose powder and 8 g. of MacCollum's salt mixture (i.e. 0.173 NaCl, 0.266 $MgSO_4$, 0.347 $H_2NaPO_4 \cdot H_2O$, 0.954 $HK_2PO_4$, 0.540 $H_4Ca(PO_4)_2 \cdot H_2O$, 0.118 iron citrate and 1.3 calcium lactate).

The ingredients were mixed with 230 cc. warm water to form a paste. The amount indicated provided the food ration for four/500 g. guinea-pigs for 24 hours.

The vitamine ration per 100 g. animal weight per diem was provided by: 1 mg. vitamine B1, 2 mg. B2, 1 mg. B6, 1 mg. PP, 1 mg. ascorbic acid, cod-liver oil (vitamines A and D) and germinating corn seed oil( vitamine E).

The food was renewed every day and given lukewarm. The transition from the normal diet to the scorbutic diet was effected by admixing decreasing doses of bran to the scorbutigenic diet. The experiment was started when the capillary resistance of the animals had dropped to 10 cm. mercury as against 30 cm. in the normal animal. The capillary resistance was measured every other day in the buttock muscles after the hair had been removed by application of an aqueous paste containing 20 g. barium sulfide, 10 g. zinc oxide and 10 g. wheat starch. The measurement was performed with Parrot's angiosterometer provided with a terminal suction cup 1 cm. in diameter.

Thereafter there was administered orally to each animal of a batch consisting of one-half the deficient animals, 1 mg. per diem and per 100 g. animal weight, of the soduim salt of 5-7-dihydroxy-2-carboxy-isoflavone.

Amongst the group of control animals of the batch, 6 out of 10 died through haemorrhage effects, and all showed a capillary resistance of less than 10. In the isoflavone-treated animals, there was a single death, due to anorexia, not haemorrhage. In the surviving animals capillary resistance was found to return to normal within 5 to 7 days.

Histological examination of the animals slaughtered after the experiment showed complete histological similarity as between the animals treated with isoflavone and the normal animals, in contrast to the untreated deficient animals. In the latter bone lesions were observed, including especially degenerative phenomena in the epiphysary cartilage, blatant activation of the thyroid as well as hyperplasia of the surrenal cortex. None of these impairments were present in any of the animals that had been restored to health by a daily dose of the sodium salt of 5-7-dihydroxy-2-carboxy-isoflavone.

EXAMPLE 2

In a clinical case of minor capillary fragility, the patient was given orally every day for one week, thirty drops of the following mixture at each of two meals:

| | Percent |
|---|---|
| Viburnum fluid extract | 5 |
| Horse-chestnut intract | 2 |
| Senecio fluid extract | 25 |
| Sodic methesculetol | 0.4 |
| Sodium salt of 5-7-dihydroxy-2-carboxy-isoflavone | 1 |
| Glycerin | 5 |

15° alcohol solution, quantity sufficient to make 100 grams

EXAMPLE 3

Vascular rupture was successfully treated by means of an ointment containing:

| | Percent |
|---|---|
| 7-ethoxy-isoflavone | 1 |
| Eucalyptol | 3 |

Excipient, quantity sufficient.

The proportion of 7-ethoxy-isoflavone in the ointment was varied from 0.5% to 5% with generally successful results. The excipient in one satisfactory ointment had the following composition:

| | Percent |
|---|---|
| Propylene glycol stearate | 19.5 |
| Fluid vaseline | 3 |
| Vaseline oil | 1.5 |
| Hydrogenated palm oil | 5 |
| Sodium salt of methyl para-oxybenzoate | 0.1 |
| Distilled water | 70.9 |
| | 100 |

A remarkable feature of 7-ethoxy-isoflavone is its very strong percutaneous activity, and its greater effectiveness in this respect over rutine. Moreover, the same ointments have given excellent results on local inflammations (periphlebitis, arthritus, etc.).

EXAMPLE 4

Ordinary vitaminic deficiency eliminated in a week by oral administration to the patient of a bolus containing 5 mg. of the sodium salt of 5-7-dihydroxy-2-carboxy-isoflavone and 5 mg. 7-ethoxy-isoflavone, accompanied by a suitable amount of excipient to make up one bolus. The bolus consisted of a kernel containing 50% of the active ingredient mixed with 50% of excipient of the following composition:

| | Percent |
|---|---|
| Magnesium stearate | 2 |
| Diatom powder | 2 |
| Talc powder | 22 |
| Shellac varnish, according to size | 2–4 |

Saccharose, quantity sufficient.

It is to be noted however that the proportion of active ingredient in the bolus or other medicine can vary greatly, as within the range from 1 to 100 mg.

EXAMPLE 5

In a case of cerebral hemorrhage a solution having the following composition was intravenously injected to the patient:

Sodium salt of 5-7-dihydroxy-2-carboxy-isoflavone: 100 mg. isotonic solution of sodium phosphates, adjusted to pH 7:5 ml.

During the first two or three days a shock dose of the solution containing 100 mg. of the active ingredient was injected daily.

EXAMPLE 6

A treatment of varicosis has consisted in oral absorption of twenty drops, 3 times a day, of a solution containing 1.5% of the sodium isoflavone 5-7-dihydroxy-2-carboxylate, in water containing 10% ethanol.

What I claim is:

1. The method of treating vascular, inflammatory and vitamine-P deficiency disorders, which comprises administering to the disordered organism at least one isoflavone compound selected from within the group consisting of 7-alkoxy-isoflavones, 7-hydroxy-isoflavones, 7-hydroxy-2-carboxy-isoflavones and the sodium salt thereof, 7-hydroxy - 2 - carbalkoxy - isoflavones, 7 - alkoxy - 2 - carboxy - isoflavones, 7 - alkoxy - 2 - carbalkoxy - isoflavones, the sodium salts of the 7-alkoxy-2-carboxy-isoflavones, 5-7-dihydroxy - isoflavone, 5 - 7 - dihydroxy - 2 - carboxy-isoflavone and the sodium salt thereof, and 5-7-dihydroxy-2-carbalkoxy-isoflavones, wherein the alkoxy groups and the alkoxy portions of the carbalkoxy groups contain no more than 5 carbon atoms.

2. The method of claim 1, which comprises administering a dose of said compound within the range from about 5 to about 500 milligrams per diem.

3. The method of treating vascular, inflammatory and vitamine-P deficiency disorders, which comprises administering to the disordered organism from about 5 mg. to about 500 mg. per diem of an isoflavone compound of the general formula:

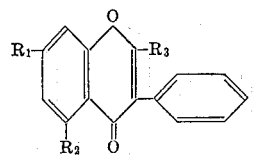

wherein $R_1$ is selected from within the group consisting of hydroxyl and alkoxy radicals, $R_2$ is selected from within the group consisting of hydrogen and a hydroxyl radical, and $R_3$ is selected from within the group consisting of hydrogen and substituted and unsubstituted carboxyl radicals.

4. The method of treating vascular and P-vitamine deficiency disorders, which comprises administering to the disordered organism from 5 to 150 mg. per diem of the sodium salt of 5-7-dihydroxy-2-carboxy-isoflavone.

5. The method of treating vascular and P-hypovitaminosis disorders comprising orally administering to the disordered human organism from about 5 to about 150 mg. per diem of the sodium salt of 5-7-dihydroxy-2-carboxy-isoflavone.

6. The method of treating vascular and P-hypovitaminosis disorders which comprises parenterally administering to the disordered human organism from about 5 to about 150 mg. per diem of the sodium salt of 5-7-dihydroxy-2-carboxy-isoflavone.

7. The method of treating vascular and P-hypovitaminosis and inflammatory disorders which comprises administering to the disordered human organism from about 5 to about 150 mg. per diem of 7-ethoxy-isoflavone.

8. The method of treating vascular and P-hypovitaminosis and inflammatory disorders which comprises administering orally to the disordered human organism from about 5 to about 150 mg. per diem of 7-ethoxy-isoflavone.

9. The method of treating vascular, P-hypovitaminosis and inflammatory disorders which comprises administering percutaneously to the disordered human organism from about 5 to about 150 mg. per diem of 7-ethoxy-isoflavone.

10. A therapeutic composition in the form of a bolus for oral ingestion, which contains from about 5 to about 15 mg. of sodium isoflavone-5-7-dihydroxy-2-carboxylate and excipient.

11. A therapeutic composition in the form of a liquid for parenteral injection which comprises a solution containing sodium isoflavone-5-7-dihydroxy-2-carboxylate.

12. The composition claimed in claim 11, wherein said solution contains about 100 mg. of said carboxylate per 5 cc. of a sodium phosphate solution at pH 7.

13. A therapeutic composition in the form of an ointment for percutaneous application, containing 7-ethoxy-isoflavone and excipient.

References Cited

FOREIGN PATENTS 58,503 1/1954 France.
1,215,226 4/1960 France.

LEWIS GOTTS, Primary Examiner.

I. MARCUS, FRANK CACCIAPAGLIA, M. O. WOLK, W. B. KNIGHT, Examiners.

D. MOYER, R. HUFF, Assistant Examiners.